United States Patent [19]

Schoening

[11] Patent Number: 4,664,871
[45] Date of Patent: May 12, 1987

[54] NUCLEAR POWER INSTALLATION WITH A HIGH TEMPERATURE PEBBLE BED REACTOR

[75] Inventor: Josef Schoening, Hambruecken, Fed. Rep. of Germany

[73] Assignee: Hochtemperatur-Reaktorbau GmbH, Fed. Rep. of Germany

[21] Appl. No.: 675,641

[22] Filed: Nov. 28, 1984

[30] Foreign Application Priority Data

Dec. 14, 1983 [DE] Fed. Rep. of Germany ....... 3345113

[51] Int. Cl.$^4$ .......................... G21C 7/08; G21C 7/22; G21C 15/18
[52] U.S. Cl. ..................................... 376/219; 376/338; 376/381; 376/391; 376/299; 165/145
[58] Field of Search ............... 376/212, 219, 226, 298, 376/299, 351, 381, 382, 383, 391, 393, 394, 402, 458, 265, 266, 337, 338; 165/145

[56] References Cited

U.S. PATENT DOCUMENTS

| | | | |
|---|---|---|---|
| 2,812,303 | 11/1957 | Daniels | 376/381 |
| 2,946,732 | 7/1960 | Wootton | 376/391 |
| 3,297,538 | 1/1967 | Gramm et al. | 376/266 |
| 3,321,376 | 5/1967 | Machnig et al. | 376/381 |
| 4,312,704 | 1/1982 | Schror et al. | 376/266 |
| 4,486,380 | 12/1984 | Schweiger et al. | 376/383 |
| 4,545,954 | 10/1985 | Ullrich et al. | 376/381 |

FOREIGN PATENT DOCUMENTS

| | | | |
|---|---|---|---|
| 2640786 | 3/1978 | Fed. Rep. of Germany | 376/299 |
| 3120587 | 6/1982 | Fed. Rep. of Germany | 165/145 |
| 3047959 | 7/1982 | Fed. Rep. of Germany | 376/299 |
| 3149794 | 6/1983 | Fed. Rep. of Germany | 376/381 |
| 3212266 | 6/1983 | Fed. Rep. of Germany | 376/299 |
| 3212264 | 10/1983 | Fed. Rep. of Germany | . |

Primary Examiner—Deborah L. Kyle
Assistant Examiner—Richard L. Klein
Attorney, Agent, or Firm—Robert J. Koch

[57] ABSTRACT

Disclosed is a nuclear power plant comprising a high-temperature pebble bed reactor contained in a cylindrical steel pressure vessel in which an upper part of the cylindrical steel pressure vessel, which contains a heat utilization system, is retracted and equipped with a cover upon which circulating blowers are placed. The heat utilization system comprises, in a known manner, a single steam generator. The steam generator comprises at least two sub-systems independent of one another, with their own distributors and collectors, and with their own inlet and outlet lines. A first shut-down arrangement comprises a plurality of absorber rods insertable into bores of the side reflector from above and comprises rod drives arranged outside the steel pressure vessel in the area of its retracted upper part. A second shut-down arrangement comprises small absorber spheres for introducing into the core of the reactor, and several storage containers and annular conduits for said spheres. The storage containers are also arranged outside the steel pressure vessel in the area of its retracted upper part. Annular conduits for the introduction of the small absorber sphere are, however, disposed inside the steel pressure vessel and connected with channels provided in projections of the side reflector protruding into the core.

21 Claims, 5 Drawing Figures

NUCLEAR POWER INSTALLATION WITH A HIGH TEMPERATURE PEBBLE BED REACTOR

BACKGROUND OF THE INVENTION

Field Of The Invention

The invention relates to a nuclear power installation with a high-temperature pebble bed reactor, whose core consists of a pile of spherical fuel elements which is surrounded on all sides by a reflector. A cooling gas flows through the core from the bottom to top. The nuclear power plant has a heat utilization system which is arranged above the high-temperature pebble bed reactor and located, along with said reactor, in a multi-component, cylindrical, steel pressure vessel. The heat utilization system also has cooling gas flowing through it from bottom to top. The nuclear power plant also has at least two circulating blowers adjusted to the direction of flow of the heat utilization system, and two shut-down arrangements comprising absorber elements of different types.

A high-temperature reactor with spherical fuel elements (AVR installation) is known in which the heat utilization system consists of a steam generator arranged above the reactor. The blowers for circulating the cooling gas, flowing from bottom to top through the reactor core, are located under the reactor core in this nuclear reactor. In case the blowers fail, the residual heat is transferred by natural convection to both the heat generator and the constructions surrounding the reactor core. The latter comprises, in addition to a graphite reflector jacket, a carbon brick jacket. In order to safely contain the fission products released, the nuclear reactor and the steam generator are surrounded by a double steel pressure vessel. For the shut-down of the nuclear reactor, absorber rods are provided, which may be inserted from the top into graphite columns located in the reactor core. There are no additional shut-down arrangements.

The state of the art further includes a nuclear reactor installation with a high-temperature pebble bed reactor and a plurality of steam generators housed, together with the reactor, in a cylindrical steel pressure vessel (German Offenlegungsschriften Nos. 32 12 264 and 32 12 266). Cooling gas flows from bottom to top through the reactor core. The heated cooling gas is conducted to the steam generators from above through a central hot gas line in the vessel. The circulating blowers are mounted horizontally on the outside of the jacket of the steel pressure vesel, requiring much space. The control and shut-down arrangements, which comprise a plurality of absorber rods that may be inserted from below into the bores of the side reflector and drives associated with them, also require much space. The side reflector may be provided with graphite projections, projecting into the pile of fuel elements. These projections would have bores into which additional absorber rods may be inserted. Small absorber spheres are provided as a diverse shut-down installation, for introduction into the fuel element pile.

Another nuclear reactor installation with a high-temperature pebble bed reactor also comprises several steam generators installed above the small reactor, in which the steam generators and the small reactor are both contained in a cylindrical steel pressure vessel. The cooling gas flows from bottom to top through both the reactor core and the steam generators. The circulating blowers are located entirely inside the steel pressure vessel, above the steam generators. This presumes a relatively large height of the steel pressure vessel. The small reactor is equipped with two diverse shut-down devices, which are again completely arranged in the steel pressure vessel. The effective elements in both shut-down installations consist of absorber spheres which may be inserted into vertical channels in the side reflector.

SUMMARY OF THE INVENTION

In view of the aforementioned state of the art, an object of the present invention is to provide a nuclear power plant of the abovedescribed type with a compact structure in which the heights of the steel pressure vessel and of the core structure are reduced, the core diameter is increased with respect to known reactor installations. In addition, it is an object of the present invention to provide a small, high-temperature reactor with a high power density, which is highly economical.

According to the invention, this object is attained by a nuclear power plant of the aforedescribed type in which an upper part of a cylindrical steel pressure vessel, which contains a heat utilization system, is retracted and equipped with a cover upon which circulating blowers are placed. The heat utilization system comprises, in a known manner, a single steam generator. The steam generator comprises at least two sub-systems independent of one another, with their own distributors and collectors, and with their own inlet and outlet lines. A first means for shutting down the reactor comprises, in an actually known manner, a plurality of absorber rods insertable into bores of the side reflector from above and comprises rod drives arranged outside the steel pressure vessel in the area of its retracted upper part. A second means for shutting down the reactor comprises small absorber spheres, and several storage containers and annular conduits for said spheres. The storage containers are also arranged outside the steel pressure vessel in the area of its retracted upper part. Annular conduits for the introduction of the small absorber spheres are, however, disposed inside the steel pressure vessel and connected with channels provided, in a known manner, in projections of the side reflector protruding into the core.

As the nuclear power installation according to the invention has only one steam generator, the steel pressure vessel requires a smaller diameter only above the high-temperature pebble bed reactor, and there is sufficient space available for housing the rod drives and the storage containers of the first and second means for shutting down the reactor. These structural components are further readily accessible as they are arranged outside the steel pressure vessel. The subdivision of the steam generator assures the safe operation of the reactor even in case of the failure of one of the sub-systems. By broadening the core structure (fuel element pile and reflector) and arranging the circulating blowers outside and on top of the steel pressure vessel, the height of the steel pressure vessel may be considerably economized.

Further objects, features and embodiments of the present invention will become apparent from the detailed description of preferred embodiments which follows, when considered together with the attached figures of drawings.

DETAILED DESCRIPTION OF PREFERRED EMBODIMENTS

Figure 1:
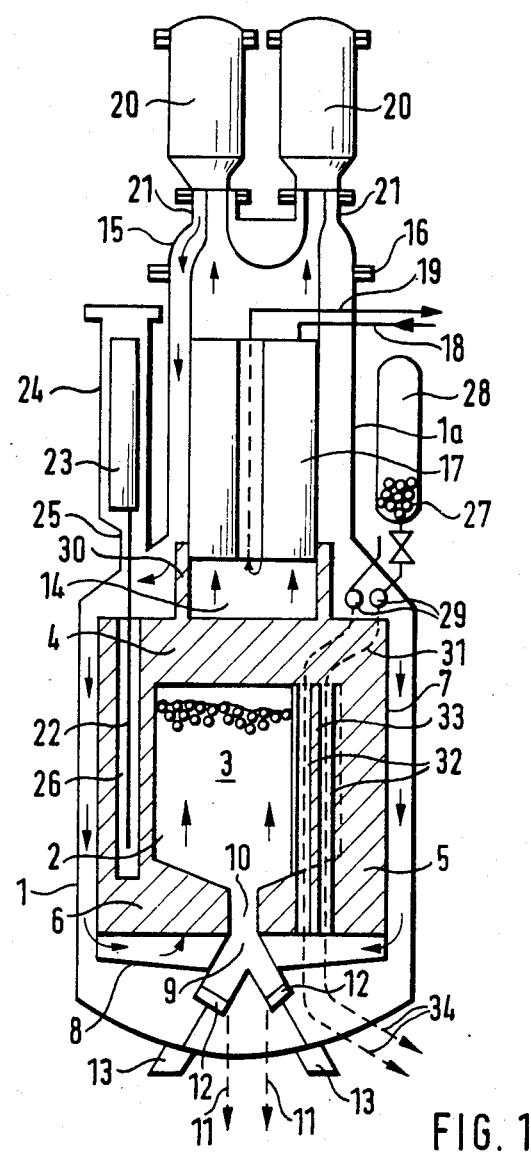
FIG. 1 shows a longitudinal section through a nuclear power installation according to the invention.
Figure 5:
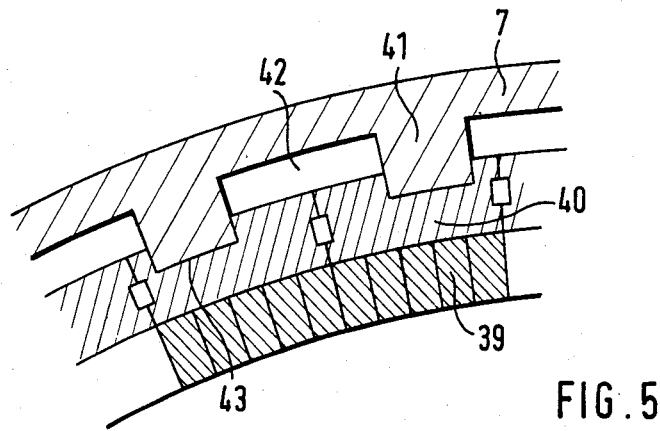
FIG. 5 a strongly enlarged section from the side reflector in a cross section.

FIG. 1 shows a steel pressure vessel 1 with a cylindrical cross section and a retracted upper part 1a. A high-temperature pebble bed reactor 2 is installed in the lower section of the said vessel 1. The core of said reactor 2 is formed by a pile 3 of spherical fuel elements, surrounded by a roof reflector 4, a side reflector 5 and a base reflector 6. The side reflector 5 rests directly on a thermal side shield 7, as explained infra (FIG. 5).

A core, support base 8, in the form of a star support, is located under the base reflector 6. The fuel elements are introduced from above and are removed by means of an outlet device at the bottom of the pile 3. The latter device here comprises a fuel element outlet tube 10 connected to two sphere conduits 11 each of which has a decollator 12. If several sphere outlet tubes are present, one decollator with two drives may be provided, one of which is always engaged. The drives 13 for the two decollators 12 are arranged outside the steel pressure vessel 1. The reactor is supplied with fuel elements in such a manner that the fuel elements attain the desired final burn-up after a single passage through the pile 3; they are therefore not returned to the core. No debris separator is required in this feeding process. With multiple passage of the fuel elements, debris separators must also be provided in addition to isolator devices.

The high-temperature pebble bed reactor has a capacity of 80 to 100 MWe; its power density amounts to approximately 4 MW/m. Cooling gas flows through it from bottom to top; the gas collects above the roof reflector 4 in a hot gas collecting chamber 14. The diameter of the fuel element pile 3 is chosen so that the lifting of fuel elements at the surface area by the flow of the cooling gas is prevented. The steel pressure vessel 1 has a diameter of approx. 7.00 m in the section containing the high-temperature pebble bed reactor.

Figure 2:
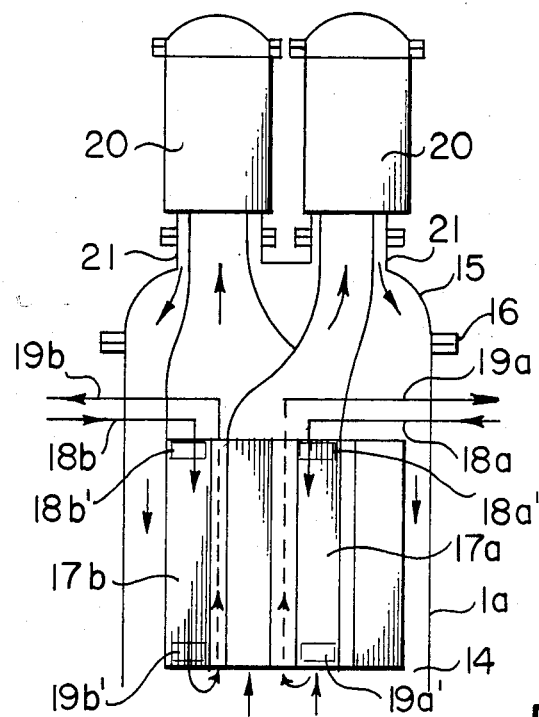
FIG. 2 shows a longitudinal section of the upper part of the steel pressure vessel according to the invention with a steam generator and circulating blowers.
Figure 3:
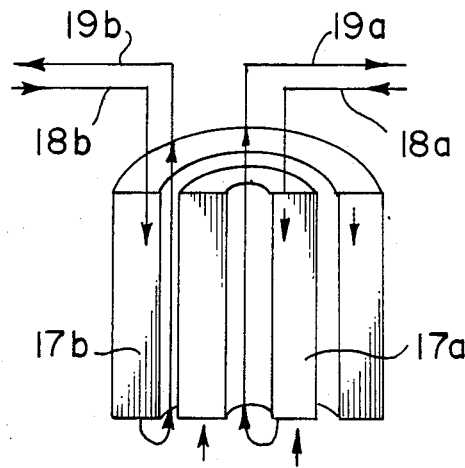
FIG. 3 shows a perspective of the steam generator.

A domed cover 15, fastened by means of a flange joint 16, is placed on the upper part 1a of the steel pressure vessel 1. A steam generator 17 is installed in section 1a. Said steam generator 17 is directly exposed to hot cooling gas from the hot gas collector chamber 14, which gas flows upward in the steam generator 17 through a line 18; the live steam is removed through a line 19. Even through only one steam generator is present, allowing the reduction of the diameter of the steel pressure vessel 1 in the upper section 1a, it is divided into two independent sub-systems 17a and 17b, as seen in FIGS. 2 and 3. Two circulating blowers 20 with shut-down elements are set on the domed cover 15; they are flanged to the fittings 21 provided on the cover.

Because the cooling gas flows from bottom to top through the pile of fuel elements and the steam generator 17 is arranged over the pile 3, the residual heat generated in the pile 3 may be removed by natural convection to the steam generator 17 in case of a failure of the circulating blowers 20.

Two means for shutting down the reactor 2 are provided to shut-down the high-temperature pebble bed reactor. The first means comprises absorber rods 22 and their drives 23, which are installed in housings 24 outside the steel pressure vessel 1 and in the area of the vessel's retracted section 1a. The housings 24 are fastened to fittings 25 mounted on the steel pressure vessel 1, by welding or flanging. The absorber rods 22 may be inserted from above into bores 26 of the side reflector 5; they drop in by gravity. The rods perform the job of emergency shut-down. If need be, the second means for shutting down the reactor may also be used for this purpose, but its actual purpose is long term shut-down.

The second means for shutting down the reactor comprises a plurality of small absorber spheres 27, several storage containers 28 for the spheres, and several annular conduits 29 (two, for example) arranged above the roof reflector 4 and shielded by an annular wall 30 against the hot gas collector chamber 14. The storage containers 28 are located outside the steel pressure vessel 1, also in the area of the retracted section 1a. The annular conduits 29 are connected by lines 31 with channels 32. The channels 32 are disposed in the radially extending projections 33 of the side reflector 5 which protrudes into the fuel element pile 3. Four such projections may be provided for example. Outlet tubes 34 for the removal of the small absorber spheres 27 are connected with the channels 32.

In the case of extreme core and pressure vessel dimensions (core diameter larger than 3.50 m, vessel diameter larger than 7 m), the high-temperature pebble bed reactor 2 may be equipped with a third means for shutting down the reactor consisting of small absorber spheres or helium-3 to be fed into the pile (not shown). This shut-down means is additionally used for long term cold shut-downs.

FIG. 2 shows the subdivision of the steam generator 17 into two sub-systems 17a and 17b, each of which is provided with its own collector 19a' and 19b', distributor 18a' and 18b', feed water line 18a and 18b, and its own live steam line 19a and 19b. The two circulating blowers 20 may be coordinated with the entire steam generator 17 (for reasons of effectiveness at least two blowers always are provided), or, as shown here, the coordination is such that each blower 20 is exposed to the cooling gas coming from one of the partial systems 17a or 17b, both in normal operation and for the removal of the residual heat.

As seen in FIG. 3, the sub-system 17a has an annular cross section and is centrally located. The sub-system 17b is also annular in its cross section and surrounds the sub-system 17a. The live steam lines 19a and 19b lie through the free internal space and the free annular space betwen the two sub-systems.

Figure 4:
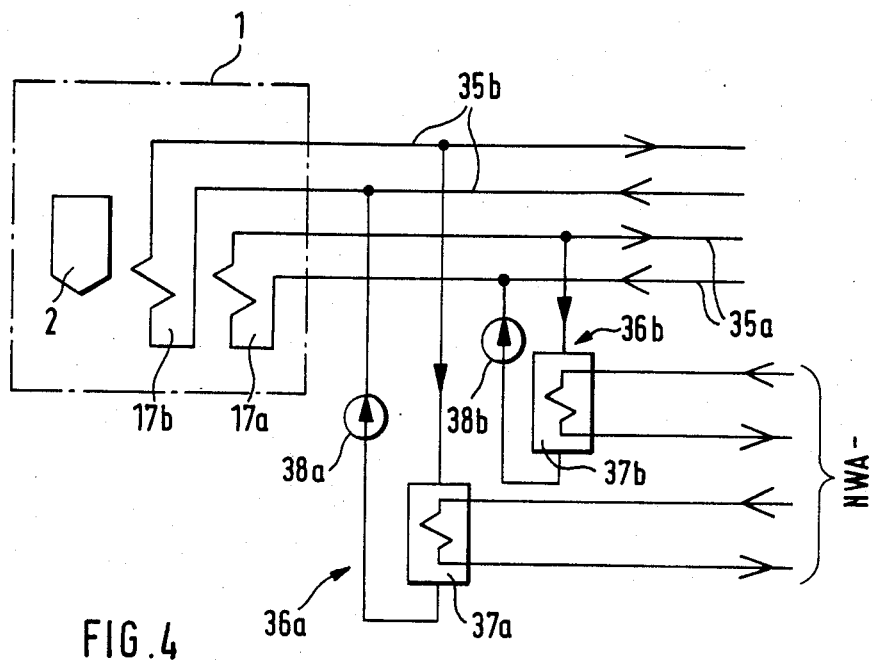
FIG. 4 a diagram of the steam generator circulating loop on the secondary side.

FIG. 4 shows the circulation on the secondary side of the two-part steam generator 17. For the recycling of the two sub-systems 17a and 17b during the removal of the residual heat, a cooling system 36a and 36b is connected with each of the corresponding secondary loops 35a and 35b. Said cooling systems comprise an auxiliary cooler 37a and 37b and a circulating pump 38a and 38b.

FIG. 5 shows a section of the side reflector 5. The reflector is composed of two graphite cylinders 39 and 40 with blocks of different size, and is supported without additional supporting elements on the thermal side shield 7. This is possible because of the upward flow of the cooling gas in the fuel element pile 3, which results in a relatively cold core bottom. The differential thermal expansions between the reflector and the thermal shield are consequently negligible. This is also true for the base reflector 6 and the thermal base shield, so that small absorber spheres may be introduced in the pile 3 without prestressing the base reflector 6.

The thermal side shield 7 has a plurality of machined support points 41. The remaining surface of the thermal shield 7 is unfinished. Grooves 43 are provided in the blocks of graphite cylinders 40. The grooves 43 are engaged by the support points 41. In this manner, rotation of the thermal side shield 7 with respect to the side reflector 5 is prevented. The support points 41 may be, for example, welded or screwed on. To equalize for tolerances, strips are fitted during the assembly or additional supports provided. The space between the support points 41 represents a gap 42 for the passage of the cooling gas, so that the thermal side shield 7 and the side reflector 5 may be cooled.

What is claimed is:

1. A nuclear power installation of compact construction, comprising:
   a high-temperature pebble bed reactor, having a core of spherical fuel elements, and a reflector which surrounds the core and which has a side section;
   a multicomponent cylindrical steel pressure vessel surrounding said reactor including a retracted upper section, a cover and a main body;
   a heat utilization system positioned in the retracted section of the pressure vessel, above the reactor in the pressure vessel, comprising only one steam generator, wherein said heat utilization system uses a cooling gas which flows from bottom to top through the core and the pressure vessel;
   at least two circulating blowers which are disposed on the cover of the vessel, which are connected with the heat utilization system, and which function in the direction of flow of the cooling gas;
   a first means for shutting down the reactor having an upper portion laterally disposed to the retracted upper section externally to the pressure vessel and a lower portion located within the main body of the pressure vessel; and
   a second means for shutting down the reactor having an upper portion laterally disposed to the upper retracted section externally to the pressure vessel and a lower portion located within the main body of the pressure vessel;
   wherein said first means for shutting down the reactor comprises a plurality of absorber rods, bores in said side section of said reflectors which function to contain said absorber rods, and rod drives disposed outside of said steel pressure vessel in the area of said retracted upper section, said rod drives functioning to insert the rods into the bores.

2. A nuclear power installation of claim 1,
   wherein said said second means for shutting down the reactor comprises small absorber spheres, a plurality of storage containers disposed outside the steel pressure vessel in the area of the retracted upper section, for containing the small absorber spheres, annular conduits connected to said storage containers which are arranged inside the steel pressure vessel, projections on said side of said reflector which protrude into the core; and channels in said projections which are connected to said annular conduits and which serve to introduce the small absorber spheres.

3. A nuclear power installation, comprising:
   a high-temperature pebble bed reactor having a core of spherical fuel elements and a reflector which surrounds the core and which has a side section;
   a multicomponent cylindrical steel pressure vessel surrounding said reactor including a retracted upper section, a cover and a main body;
   a heat utilization system positioned in the retracted section of the pressure vessel, comprising only one steam generator with a centrally located sub-system and at least one annular sub-system independent from said centrally located sub-system wherein said annular sub-system surrounds said centrally located sub-system and wherein said heat utilization system uses a cooling gas which flows from bottom to top through the core and the pressure vessel;
   at least two circulating blowers which are disposed on the cover of the vessel, which are connected with the heat utilization system, and which function in the direction of flow of the cooling gas;
   a first means for shutting down the reactor; and
   a second means for shutting down the reactor.

4. A nuclear power installation as claimed in claim 3, wherein each independent sub-system comprises a distributor, a collector, an inlet line, and an outlet line.

5. A nuclear power plant according to claim 3, wherein the first means for shutting down the reactor comprises:
   a plurality of absorber rods;
   bores in said side section of said reflectors which function to contain said absorber rods; and
   rod drives disposed outside of said steel pressure vessel in the area of said retracted upper section, said rod drives functioning to insert the rods into the bores.

6. A nuclear power plant according to claim 5, wherein the second means for shutting down the reactor comprises:
   small absorber spheres;
   a plurality of storage containers disposed outside the steel pressure vessel into the area of the retracted upper section, for containing the small absorber spheres;
   annular conduits connected to said storage containers which are arranged inside the steel pressure vessel;
   projections on said side of said reflector which protrude into the core; and
   channels in said projections which are connected to said annular conduits and which serve to introduce the small absorber spheres.

7. A nuclear power palnt according to claim 6, wherein said rod drives are means for gravitational introduction of the absorber rods of the first shut-down arrangement and said first means for shutting down comprises means for rapid shut-down (scram) of the high-temperature pebble bed reactor, and wherein the second shut-down arrangement may optionally be used for said rapid shut-down.

8. A nuclear power plant according to claim 6, wherein the second means for shutting down the reactor is a means for long-term shut-down of the high-temperature pebble bed reactor.

9. A nuclear power plant according to claim 5, further comprising:

housings for the rod drives of the first means for shutting down;

fittings in the region between the main body of the steel pressure vessel and the retracted upper section for fastening the housings to the steel pressure vessel; and flange means for attaching said housings to said fittings.

10. A nuclear power plant according to claim 5, further comprising housings for the rod drives of the first means for shutting down the reactor; and fittings in the region between the main body of the steel pressure vessel and the retracted upper section for fastening the housings to the steel pressure vessel, wherein said housings are welded to said fittings.

11. A nuclear power plant according to claim 3, further comprising:

fittings on the cover of the steel pressure vessel for fastening the circulating blowers; and flange means on the circulating blowers for attaching the blowers to said fittings.

12. A nuclear power plant according to claim 3, wherein said heat utilization system further comprises means for removal of residual heat.

13. A nuclear power plant according to claim 12, wherein said circulating blowers cooperate with said heat utilization system for both steam generation and removal of residual heat.

14. A nuclear power plant according to claim 13, wherein one circulating blower is provided for each sub-system of said heat utilization system during both steam generation and removal of residual heat.

15. A nuclear power plant according to claim 12, further comprising a secondary cooling system with a plurality of components for recooling said heat utilization system during the removal of residual heat.

16. A nuclear power plant according to claim 12, further comprising a secondary cooling system for recooling each sub-system of said heat utilization system during the removal of residual heat.

17. A nuclear power plant according to claim 3, wherein said spherical fuel elements pass through the core only once, and wherein the nuclear power plant further comprises:

a support base for said core;

at least one outlet means for removing fuel elements from the core; and decollating means provided for said outlet means for isolating the fuel elements.

18. A nuclear power plant according to claim 3, further comprising:

a thermal side shield upon which said side section of said reflector rests; and raised support points on said thermal side shield which create gaps for the passage of cooling gas.

19. A nuclear power plant according to claim 18, further comprising grooves on the side of said side section of said reflector for engaging said support points.

20. A nuclear power plant according to claim 18, wherein said support points are welded to said thermal side shield, and further comprising means for compensating for assembly tolerances.

21. A nuclear power plant according to claim 19, wherein said support points are screwed to said thermal side shield, and further comprising means for compensating for assembly tolerances.

* * * * *